(12) United States Patent
Leo et al.

(10) Patent No.: US 9,231,260 B2
(45) Date of Patent: Jan. 5, 2016

(54) SYSTEM AND METHOD FOR REDISTRIBUTION OF THE FLOW OF FUEL UNDER FAULTED CONDITIONS IN A FUEL CELL SYSTEM

(75) Inventors: Frank Leo, Honeoye Falls, NY (US); Kiran Mallavarapu, Honeoye Falls, NY (US); Lihling Tzuu, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2889 days.

(21) Appl. No.: 11/635,235

(22) Filed: Dec. 7, 2006

(65) Prior Publication Data
US 2008/0138689 A1   Jun. 12, 2008

(51) Int. Cl.
*H01M 8/04*   (2006.01)

(52) U.S. Cl.
CPC ...... *H01M 8/04201* (2013.01); *H01M 8/04089* (2013.01); *Y02E 60/50* (2013.01)

(58) Field of Classification Search
None
See application file for complete search history.

(56) References Cited

U.S. PATENT DOCUMENTS

| 6,293,251 | B1 | 9/2001 | Hemmerlein et al. |
| 6,755,077 | B2 | 6/2004 | Clingerman et al. |
| 7,007,676 | B1 * | 3/2006 | Schuricht et al. ............. 123/479 |
| 2003/0226399 | A1 * | 12/2003 | Clingerman et al. ....... 73/119 A |

FOREIGN PATENT DOCUMENTS

GB       2 449 706 A     12/2008

* cited by examiner

*Primary Examiner* — Barbara Gilliam
*Assistant Examiner* — Adam A Arciero
(74) *Attorney, Agent, or Firm* — John A. Miller; Miller IP Group, PLC

(57) ABSTRACT

A system and method for redistribution of the flow of fuel under faulted conditions in a fuel cell system is disclosed. The fuel cell system includes a fuel cell stack; a fuel tank for storing fuel; fuel injectors that sequentially supply fuel from the fuel tank to the fuel cell stack; and a controller for determining whether a fault condition exists in one of the fuel injectors. If a fault condition exists in the first injector, the controller is capable of redistributing the flow of fuel from a first injector to a second injector.

18 Claims, 2 Drawing Sheets

SYSTEM AND METHOD FOR REDISTRIBUTION OF THE FLOW OF FUEL UNDER FAULTED CONDITIONS IN A FUEL CELL SYSTEM

FIELD OF THE INVENTION

The present invention relates to a fuel cell system, and in particular, to a system and method for redistribution of the flow of fuel, such as $H_2$, under faulted conditions in a fuel cell system.

BACKGROUND OF THE INVENTION

In a typical fuel cell system, each fuel cell stack has multiple $H_2$ supply valves or injectors to supply hydrogen to the anode side of the PEM fuel cell stack. Multiple injectors are used to accurately control the flow and pressure of hydrogen from idle to full power. If all injectors are closed, no $H_2$ will flow, and the fuel cell power output is zero. If all injectors are open, the maximum amount of $H_2$ will flow and the fuel cell will output maximum power. In the case where the fuel cell system has five injectors and all injectors are sized the same, the next injector is opened when the previous injector(s) are at 100% open. Each injector thus accounts for 20% of full power. The desired $H_2$ flow is checked against a maximum possible flow upper limit based on current temperature and pressure conditions. The minimum value of the desired setpoint and the maximum possible flow is used for the first injector, and the rest of the flow is assigned to the other injectors. The same procedure is used to assign the flow for the second injector and so on.

If one of the injectors fails, the system performance is highly dependent on which of the five injectors fails. If the first injector fails and is not able to open any longer, then any requested flow under 20% will result in no flow. This will cause the fuel cell to cease generating power. If the second injector fails, then operation will be limited between 0-20% and 40%-100%. Likewise, if the third injector fails, then operation will be limited between 0-40% and 60%-100%. Thus, there is a desire to provide a method for the redistribution of $H_2$ flow that overcomes the inherent problems associated with failure of one or more injectors in a fuel cell system, and the limitation of power associated therewith.

SUMMARY OF THE INVENTION

According to an embodiment, a fuel cell system comprises a fuel cell stack; a fuel tank for storing fuel; a plurality of fuel injectors that sequentially supply fuel from said fuel tank to said fuel cell stack; and a controller for determining whether a fault condition exists in one of said plurality of fuel injectors, and if so, said controller redistributes the flow of fuel from a first injector to a second injector when the fault condition exists in said first injector.

According to another embodiment, a method for redistribution of the flow of fuel under faulted conditions in a fuel cell system, comprises the steps of:

determining whether a fault condition exists in a first injector of a plurality of injectors of said fuel cell system, and redistributing the flow of fuel from the one of said plurality of injectors to a second injector when the fault condition exists in said first injector.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
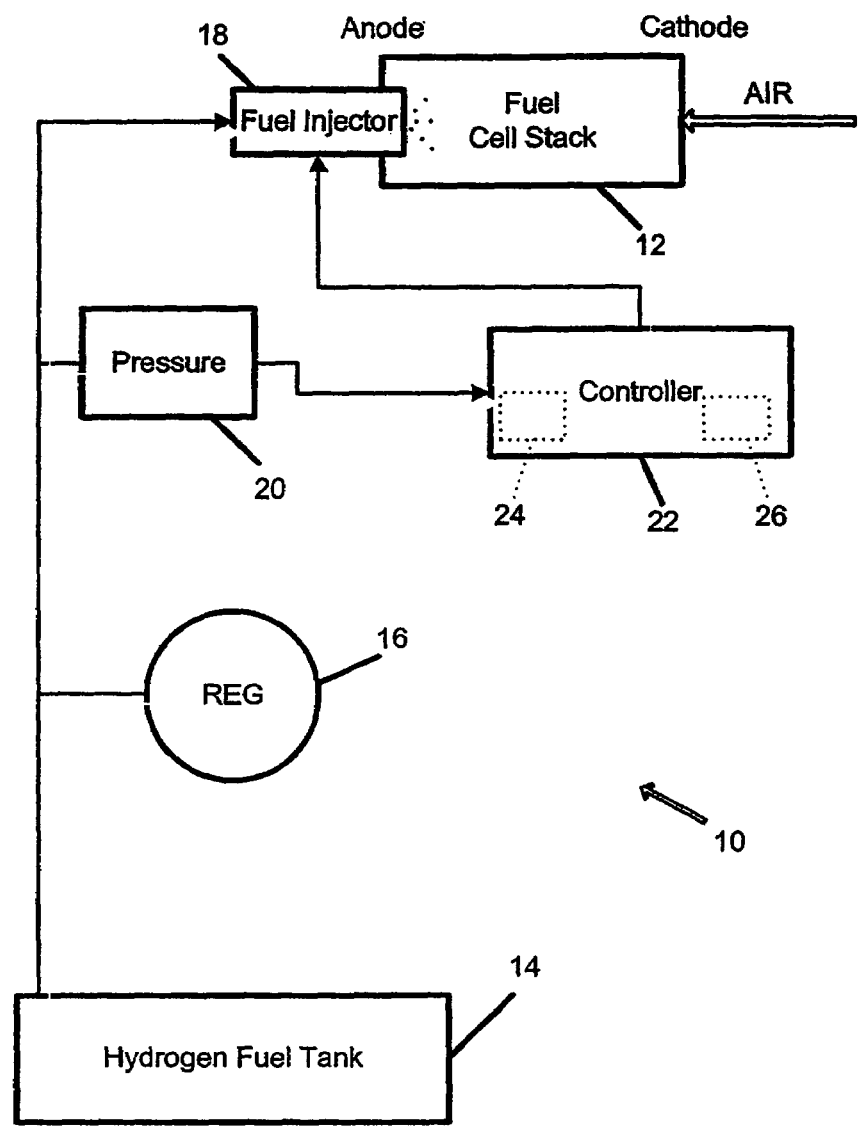
FIG. 1 is a functional block diagram of a fuel cell system including at least one fuel injector and a controller that implements the method fo the invention.

Referring now to FIG. 1, a fuel cell system 10 includes a fuel cell stack 12, a fuel tank 14 for storing fuel, a fuel regulator 16 and at least one fuel injector 18 for supplying fuel from the fuel tank 14 to the fuel cell stack 12. For simplicity, only one injector 18 is shown in FIG. 1. However, a plurality of injectors 18 are typically used to inject the fuel sequentially into the fuel cell stack 12. A pressure sensor 20 generates pressure signals that are used by a controller 22 to diagnose a failed regulator. The controller 22 can sense a pressure drop and take appropriate action(s) that may include shutdown, turning on an indicator, or other actions. Typically, the flow of fuel, such as $H_2$, is supplied to the anode side of the fuel cell stack 12, while air (or $O_2$) is supplied to the cathode side of the fuel cell stack 12. It will be appreciated that the invention is not limited by the type of fuel, and that the invention can be practiced with any desired type of fuel that can be used by the fuel cell stack 12.

The controller 22 includes electronic circuitry 24 and control algorithm software 26. It is an aspect of the invention to provide a system and method for the redistribution of $H_2$ flow that overcomes the inherent problems associated with failure of one or more injectors 18 that is implemented by the control algorithm software 26 of the controller 22.

In general, a failure of the injector 18 can be the result in two potential failure mechanisms: 1) open state, and 2) closed state. An open state failure mechanism of the injector 18 refers to the condition in which the injector 18 fails in a state that allows for maximum possible $H_2$ flow through the injector 18 based on temperature and pressure conditions and the design of the injector 18. A closed state failure mechanism of the injector 18 refers to the condition in which the injector 18 fails in a state that allows for zero $H_2$ flow through the injector 18.

Electronic circuitry in the controller 22 is capable of detecting the following conditions of each injector 18: a 'normal' condition, an 'open circuit' condition, a 'short to power' condition, and a 'short to ground' condition. In the case of normal operation, each injector 18 is opened in sequence based on the requested total $H_2$ flow required, as described above. If the injector 18 is detected to be in an 'open circuit' condition, the injector 18 is in the closed state failure mechanism, no current can flow through the injector 18, and hence, no flow of hydrogen is possible. If the injector 18 is detected to be in a 'short to power' or a 'short to ground', each of the faults will result in only one of the fault conditions—a closed state failure mechanism or an opened state failure mechanism, based on the designed electronic circuitry. For example, in one possible design of the electronic circuitry, the result of the fault condition of 'short to power' will be a closed state failure mechanism, no current can flow through the injector 18, and hence, no flow of hydrogen is possible, and the result of the fault condition of 'short to ground' will be an open state failure mechanism in which the maximum hydrogen flow exists.

By making use of the information of the four failure conditions—'normal', 'open circuit', 'short to power' and 'short to ground'—the desired $H_2$ flow requirement is used to pass the additional flow requirements, if any, on to the next injector in the sequence. Under this method of operation, in a five (5) injector fuel cell system, if any one injector fails operation up to 80% is provided. If any two injectors 18 fail operation up to 60% is provided. This is a significant improvement over the conventional method of operation that could cause non-operation if the first injector had failed and a large power gap if the second injector has failed. If the injector 18 is detected to have failed shorted to ground, this means that the injector 18 is always on. This effectively limits operation to power levels above 20%. By knowing that the injector 18 is always open, the algorithm of the invention accounts for this additional flow can successfully control operation of the fuel cell at any level above this limit.

Figure 2:
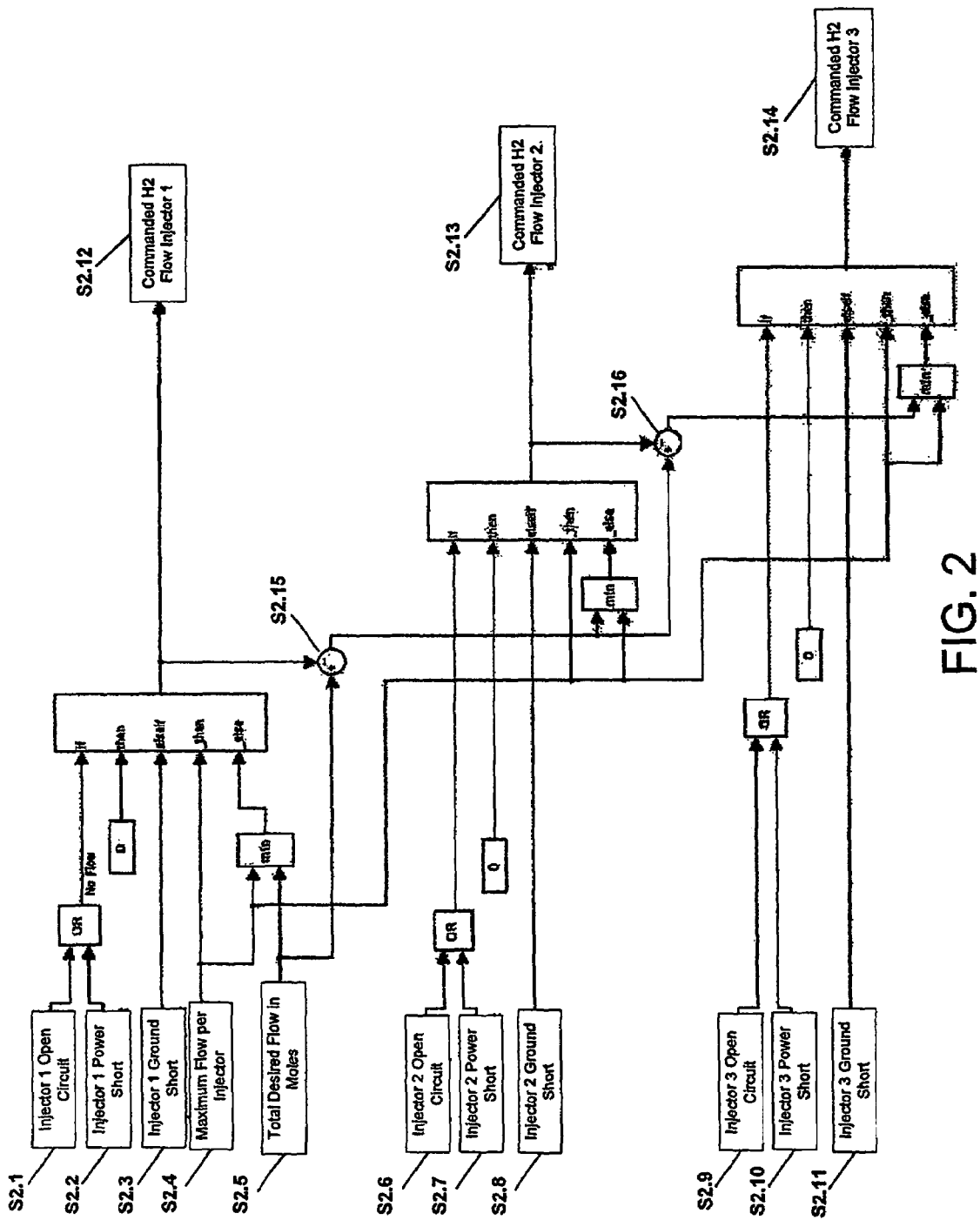
FIG. 2 is a flowchart illustrating steps performed by the controller in FIG. 1.

Referring now to FIG. 2, exemplary steps for the redistribution of hydrogen flow in the fuel system 10 under fault conditions are shown. For simplicity, the method of the invention is described for a fuel system 10 including three injectors 18a, 18b, 18c. However, it will be appreciated that the principles of the invention is not limited to a three injector fuel system, and that the principles of the invention can be applied to an injector fuel cell system having any desired number of injectors 18.

The controller 22 determines whether an 'open circuit' or a 'short to power' condition exists in the first injector 18a at Steps S2.1 and S2.2. As mentioned above, if either of these conditions is met, then no $H_2$ flow from the first injector 18a is possible, and the controller 22 sets the flow from the first injector 18a to zero.

On the other hand, if the controller 22 determines that the first injector 18a is in a 'short to ground' condition in Step S2.3, then the controller 22 sets the $H_2$ flow from the first injector 18a to the maximum $H_2$ flow in Step S2.4. The maximum $H_2$ flow per injector is determined by the controller 22 by dividing the total $H_2$ flow by the number of injectors 18 in Step S2.5. For example, in the illustrated method, the maximum $H_2$ flow per injector would be 33.3% (100%/3 injectors). This value is determined to be the same for each injector 18. In Step S2.5, the controller 22 also determines the desired $H_2$ flow in moles as demanded by the fuel system 10.

In Step S2.12, the controller 22 determines the commanded $H_2$ flow in moles for the first injector 18a. If the first injector 18a is determined to be in either the 'open circuit' condition or the 'short to power' condition, then the commanded $H_2$ flow is determined to be zero. If the first injector 18a is determined to be in a 'short to ground' condition, then the commanded $H_2$ flow is determined to be the maximum $H_2$ flow per injector (in this case 33.3%). The first injector 18s is determined to be in a 'normal' state or condition when the first injector 18s is not determined to be in an 'open circuit' condition, a 'power to short' condition, or a 'short to ground' condition, and the commanded $H_2$ flow is the minimum between the maximum $H_2$ flow per injector (in this case, 33.3%) and the total desired $H_2$ flow in moles.

In Step S2.15, the controller 22 determines the difference between the desired $H_2$ flow and the commanded $H_2$ flow and passes this value on to the next injector 18 in the fuel system 10. This aspect of the invention enables for the redistribution of $H_2$ flow under faulted conditions of an injector 18, unlike conventional fuel systems. For example, if the first injector 18a is determined to be in either the 'open circuit' or the 'short to power' condition, then the commanded $H_2$ flow is determined to be zero. If the total desired $H_2$ flow is determined to be, for example, 20%, then the difference between the commanded $H_2$ flow and the total desired $H_2$ flow is determined to be 20% in Step S2.15. This value of 20% is then passed on to the next injector in the sequence, i.e., the second injector 18b, as described below. If the first injector 18a is determined to be in a 'normal' condition, then the difference between the commanded $H_2$ flow and the desired $H_2$ flow determined by the controller 22 in Step S2.15 is zero.

Similar to the first injector 18a, the controller 22 determines whether the second injector 18b is in an 'open circuit' condition, a 'short to power' condition, a 'short to ground' condition or a 'normal' condition. If the second injector 18b is determined to be in the 'open circuit' condition in Step S2.6 or the 'short to power' condition in Step S2.7, then the commanded $H_2$ flow is set to zero in Step S2.13. If the second injector 18b is determined to be in the 'short to ground' condition in Step S2.8, then the commanded $H_2$ flow is set to the maximum $H_2$ flow per injector (in the case, 33.3%) in Step S2.13. Otherwise, the controller 22 determines that the second injector 18b is in the 'normal' condition.

As mentioned above, the controller 22 determines the difference between the desired $H_2$ flow and the commanded $H_2$ flow and passes this value on to the next injector 18 in the fuel system 10 in Step S2.15. If the second injection 18b is determined to be in the 'normal' condition, then the controller 22 determines the minimum value between the difference between the desired $H_2$ flow and the commanded $H_2$ flow of the first injector 18a and the maximum $H_2$ flow per injector (in this case 33.3% in Step S2.4). The commanded $H_2$ flow for the second injector 18b is set to this minimum value in Step S2.13.

Similar to Step S2.15 of the first injector 18a, the controller 22 determines the difference between the desired $H_2$ flow and the commanded $H_2$ flow and passes this value on to the next injector 18 in the fuel system 10 in Step S2.16. Specifically, this value of 20% is used by the controller 22 to determine the minimum value when the second injector 18b is in the 'normal' condition, and to determine the difference between the commanded $H_2$ flow and the desired $H_2$ flow of the second injector 18b in Step S2.16.

Again, this aspect of the invention enables for the redistribution of $H_2$ flow under faulted conditions of any injector 18 in the fuel system 10 (i.e., the first and/or second injectors 18a, 18b). For example, if the first injector 18a is determined to be in either the 'open circuit' or the 'short to power' condition, then the commanded $H_2$ flow is determined to be zero. If the total desired $H_2$ flow is determined to be, for example, 20%, then the difference between the commanded $H_2$ flow and the total desired $H_2$ flow is determined to be 20% in Step S2.15. This value of 20% is then passed on to the second injector 18b. If the second injector 18b is determined to be in the 'normal' condition, then the minimum value determined by the controller 22 would be 20% (minimum of 33.3% and 20%), and the commanded $H_2$ flow for the second injector 18b would be 20%. However, the controller 22 would determine that the difference between the commanded $H_2$ flow (20%) and the minimum value (20%) is equal to zero in Step S2.16, and this value would be passed on to the next injector 18 (i.e., the third injector 18c) in the sequence. Thus, in this example, the method of the invention would redistribute the $H_2$ flow under the faulted condition ('open circuit' condition or 'short to power' condition) of the first injector 18a on to the second injector 18b.

In another example, if the first injector 18a is determined to be in 'short to ground' condition, then the commanded $H_2$ flow is determined to be equal to the maximum flow per injector (33.3%). If the total desired $H_2$ flow is determined to be, for example, 40%, then the difference between the commanded $H_2$ flow and the total desired $H_2$ flow is determined to be 7% in Step S2.15. This value of 7% is then passed on to the second injector 18b. If the second injector 18b is determined to be in the 'normal' condition, then the minimum value determined by the controller 22 would be 7% (minimum of 33.3% and 7%), and the commanded $H_2$ flow for the second injector 18b would be 7%. However, the controller 22 would determine that the difference between the commanded $H_2$ flow (7%) and the minimum value (7%) would be equal to zero in Step S2.16, and this value would be passed on to the next injector 18 (i.e., the third injector 18c) in the sequence. Thus, the method of the invention enables the second injector 18b to redistribute the $H_2$ flow under the faulted condition ('short to ground' condition) of the first injector 18a.

Similar to the first and second injectors 18a, 18b, the controller 22 determines whether the third injector 18c is in an 'open circuit' condition, a 'short to power' condition, a 'short to ground' condition or a 'normal' condition. If the third injector 18c is determined to be in the 'open circuit' condition in Step S2.9 or the 'short to power' condition in Step S2.10, then the commanded $H_2$ flow is set to zero in Step S2.14. If the third injector 18c is determined to be in the 'short to ground' condition in Step S2.11, then the commanded $H_2$ flow is set to the maximum $H_2$ flow per injector (in the case, 33.3%) in Step S2.14. Otherwise, the controller 22 determines that the third injector 18c is in the 'normal' condition.

As mentioned above, the controller 22 determines the difference between the desired $H_2$ flow and the commanded $H_2$ flow in Step S2.16 and passes this value on to the next injector 18 in the fuel system 10. If the third injection 18c is determined to be in the 'normal' condition, then the controller 22 determines the minimum value between the difference between the desired $H_2$ flow and the commanded $H_2$ flow of the second injector 18b from Step S2.16 and the maximum $H_2$ flow per injector (in this case 33.3% in Step S2.4). The commanded $H_2$ flow for the third injector 18c is set to this minimum value in Step S2.14.

Again, the method of the invention enables for the redistribution of $H_2$ flow under faulted conditions of any injector 18 in the fuel system 10. For example, if the first injector 18a is determined to be an 'open circuit' condition, then the commanded $H_2$ flow for the first injector 18a is set to zero. If the total desired $H_2$ flow for the fuel system 10 is determined to be, for example, 25%, then the difference between the commanded $H_2$ flow and the total desired $H_2$ flow is determined to be 25% in Step S2.15. This difference value of 25% is then passed on to the second injector 18b. If the second injector 18b is determined to be in a 'short to power' condition, then the minimum value determined by the controller 22 would be 25% (minimum of 33.3% and 25%), while the commanded $H_2$ flow for the second injector 18b would be equal to zero. However, the controller 22 would determine that the difference between the commanded $H_2$ flow (0%) and the minimum value (25%) is equal to 25% in Step S2.16, and this difference value would be passed on to the next injector 18 (i.e., the third injector 18c) in the sequence. Thus, the method of the invention would redistribute the $H_2$ flow under the faulted condition ('open circuit' condition or 'short to power' condition) of the first and second injectors 18a, 18b.

It will be appreciated that the system and method of the invention redistributes the $H_2$ flow under the faulted condition of any injector 18 in the fuel system 10 by using information readily available in conventional fuel systems. The system and method of the invention provides for improved reliability of the fuel system by continued operation of other non-faulted injectors in the fuel system with no impact in cost.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, comprising:
   a fuel cell stack;
   a fuel tank for storing fuel;
   a plurality of fuel injectors that sequentially supply fuel from said fuel tank to said fuel cell stack; and
   a controller for determining whether a fault condition exists in one of said plurality of fuel injectors, said controller configured for redistributing the flow of fuel from a first injector to a second injector when the fault condition exists in said first injector.

2. A system as set forth in claim 1, wherein said fault condition comprises one of a normal condition, an open circuit condition, a short to power condition, and a short to ground condition.

3. A system as set forth in claim 2, wherein said controller determines that a commanded hydrogen flow of said first injector is equal to zero when either the open circuit condition or the short to power condition exists.

4. A system as set forth in claim 2, wherein said controller determines that a commanded flow of fuel from said first injector is equal to a maximum flow of fuel per injector when the short to ground condition exists.

5. A system as set forth in claim 2, wherein said controller determines that a commanded flow of fuel of said first injector is equal to a minimum between a maximum flow per injector and a total desired flow of fuel of said fuel cell system when the normal condition exists.

6. A system as set forth in claim 1, wherein said controller being capable of redistributing the flow of fuel from said first injector by determining a difference between a commanded flow of fuel of said first injector and a total desired flow of fuel of said fuel cell system.

7. A system as set forth in claim 6, wherein said controller determines whether said second injector is in the normal condition, and determining a minimum of the difference between the commanded flow of fuel of said first injector and a maximum flow of fuel per injector for said second injector when the normal condition exists.

8. A system as set forth in claim 1, wherein said second injector is a next injector in the sequence for providing fuel from said fuel tank to said fuel cell stack.

9. A system as set forth in claim 1, wherein said fuel comprises $H_2$, and wherein $H_2$ is supplied to an anode side of said fuel cell stack.

10. A method for redistribution of the flow of fuel under faulted conditions in a fuel cell system, comprising the steps of:
    determining whether a fault condition exists in a first injector of a plurality of injectors of said fuel cell system, and redistributing the flow of fuel from the one of said plurality of injectors to a second injector when the fault condition exists in said first injector.

11. A method as set forth in claim 10, further comprising the step of determining whether the fault condition is one of a normal condition, an open circuit condition, a short to power condition, and a short to ground condition.

12. A method as set forth in claim 11, further comprising the step of determining that a commanded hydrogen flow of said first injector is equal to zero when either the open circuit condition or the short to power condition exists.

13. A method as set forth in claim 11, further comprising the step of determining that a commanded flow of fuel from said first injector is equal to a maximum flow of fuel per injector when the short to ground condition exists.

14. A method as set forth in claim 11, further comprising the step of determining that a commanded flow of fuel of said first injector is equal to a minimum between a maximum flow per injector and a total desired flow of fuel of said fuel cell system when the normal condition exists.

15. A method as set forth in claim 10, further comprising the step of determining a difference between a commanded flow of fuel of said first injector and a total desired flow of fuel of said fuel cell system.

16. A method as set forth in claim 15, further comprising the step of determining whether said second injector is in the normal condition, and determining a minimum of the difference between the commanded flow of fuel of said first injector and a maximum flow of fuel per injector for said second injector when the normal condition exists.

17. A method as set forth in claim 10, wherein said second injector is a next injector in the sequence for providing fuel from said fuel tank to said fuel cell stack.

18. A method as set forth in claim 10, wherein said fuel comprises $H_2$, and wherein $H_2$ is supplied to a anode side of said fuel cell stack.

* * * * *